Figure 1:
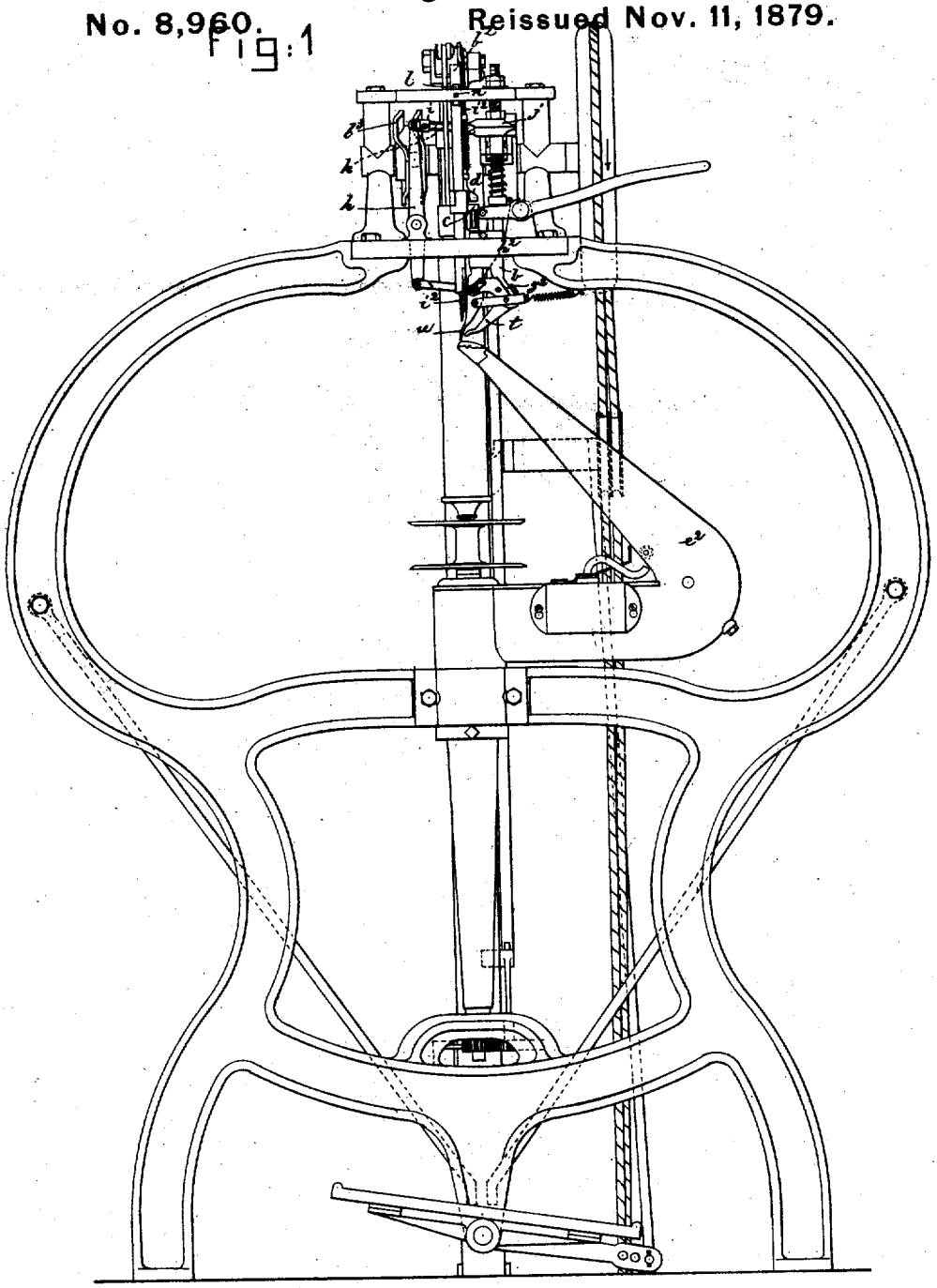

5 Sheets—Sheet 1.

G. McKAY & L. R. BLAKE,

Assignors to McKay Sewing-Machine Association, G. McKay, Trustee.

Sewing-Machine.

No. 8,960. Reissued Nov. 11, 1879.

Witnesses.

A. Wunderwadel

L. F. Connor

Inventors.

Assrs. Gordon McKay and Lyman R. Blake,
McKay Sewing Machine Association
Gordon McKay Trustee,
by Crosby & Gregory. Attys.

THE NORRIS PETERS CO., PHOTO-LITHO., WASHINGTON, D. C.

G. McKAY & L. R. BLAKE,

Assignors to McKay Sewing-Machine Association, G. McKay, Trustee.

Sewing-Machine.

No. 8,960. Reissued Nov. 11, 1879.

Witnesses.

A. Wunderwadel

L. F. Connor.

Inventors.

Assees Gordon McKay, & Lyman R Blake.
McKay Sewing Machine Association
Gordon McKay Trustee,
by Crosby & Gregory, Attys

THE NORRIS PETERS CO., PHOTO-LITHO., WASHINGTON, D. C.

5 Sheets—Sheet 3.

G. McKAY & L. R. BLAKE,

Assignors to McKay Sewing-Machine Association, G. McKay, Trustee.

Sewing-Machine.

No. 8,960. Reissued Nov. 11, 1879.

Witnesses.

A. Hunerwadel

L. F. Connor

Inventors

Assees Gordon McKay and Lyman R Blake,
McKay Sewing Machine Association
Gordon McKay Trustee.
by Crosby & Gregory, Attys

THE NORRIS PETERS CO., PHOTO-LITHO., WASHINGTON, D. C.

5 Sheets—Sheet 4.

G. McKAY & L. R. BLAKE,

Assignors to McKay Sewing-Machine Association, G. McKay, Trustee.

Sewing-Machine.

No. 8,960. Reissued Nov. 11, 1879.

Witnesses.
A. Hunewadel
L. F. Connor.

Inventors.
Gordon McKay, & Lyman R. Blake.
Assees McKay Sewing Machine Association
Gordon McKay Trustee,
by Crosby & Gregory, Attys.

THE NORRIS PETERS CO., PHOTO-LITHO., WASHINGTON, D. C.

5 Sheets—Sheet 5.
G. McKAY & L. R. BLAKE,
Assignors to McKay Sewing-Machine Association, G. McKay, Trustee.
Sewing-Machine.
No. 8,960. Reissued Nov. 11, 1879.
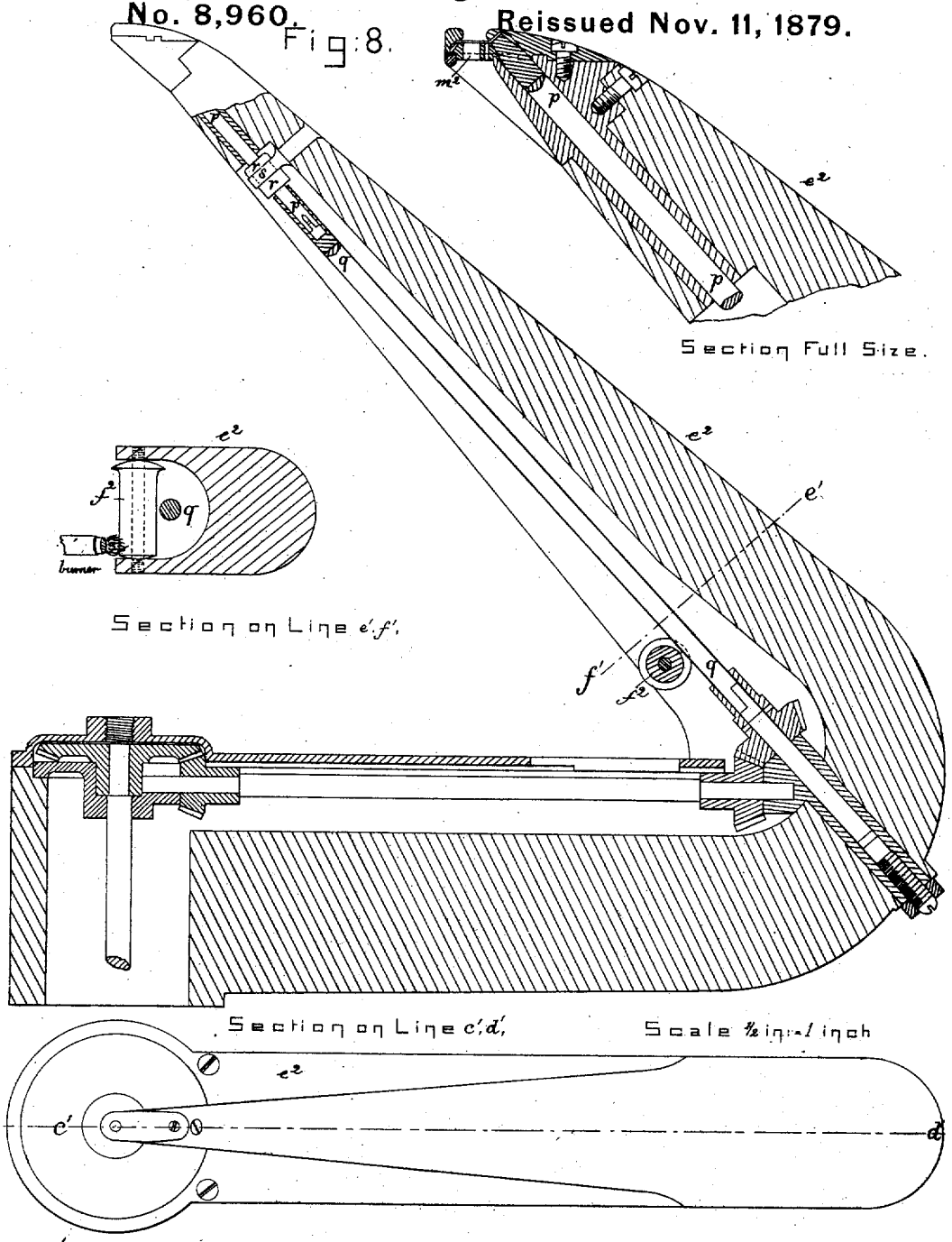
Witnesses.
A. Hunewadel
L. D. Connor.
Inventors.
Assees Gordon McKay & Lyman R Blake,
McKay Sewing Machine Association
Gordon McKay Trustee,
by Crosby & Gregory, Attys
THE NORRIS PETERS CO., PHOTO-LITHO., WASHINGTON, D. C.

UNITED STATES PATENT OFFICE.

GORDON McKAY, OF CAMBRIDGE, MASSACHUSETTS, TRUSTEE McKAY SEWING MACHINE ASSOCIATION, ASSIGNEE OF GORDON McKAY AND LYMAN R. BLAKE.

IMPROVEMENT IN SEWING-MACHINES.

Specification forming part of Letters Patent No. 45,422, dated December 13, 1864; Reissue No. 8,960, dated November 11, 1879; application filed September 24, 1879.

*To all whom it may concern:*

Be it known that GORDON McKAY, of Boston, Suffolk county, and LYMAN R. BLAKE, of Quincy, Norfolk county, both in the State of Massachusetts, invented jointly certain Improvements in Sewing-Machines; and it is hereby declared that the following, taken in connection with the drawings which accompany and form part of this specification, is a description of the said invention sufficient to enable those skilled in the art to practice it.

This invention relates to improvements on the sewing mechanism patented on the 12th day of August, 1862, to GORDON McKAY and Robert H. Mathies, which patent is numbered 36,163.

As the general construction and operation of the said mechanism is fully shown and decribed in the aforesaid patent, these will not be set forth in this specification, except, perhaps, partially and incidentally, to elucidate the novelties therewith connected, especially as the old construction, shown in the aforesaid patent, where it is not changed by the invention herein set forth, is clearly shown in the drawings herewith accompanying, of which—

Figure 2:
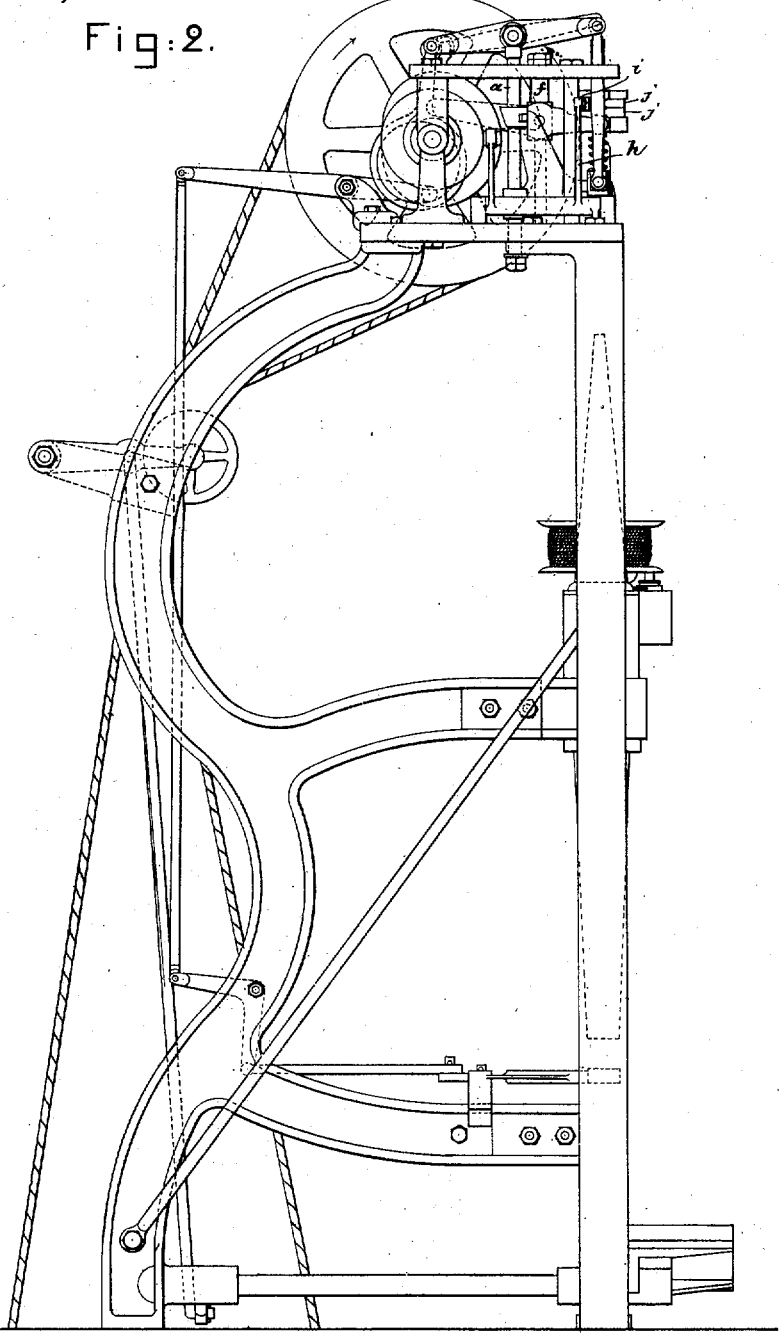
Figure 3:
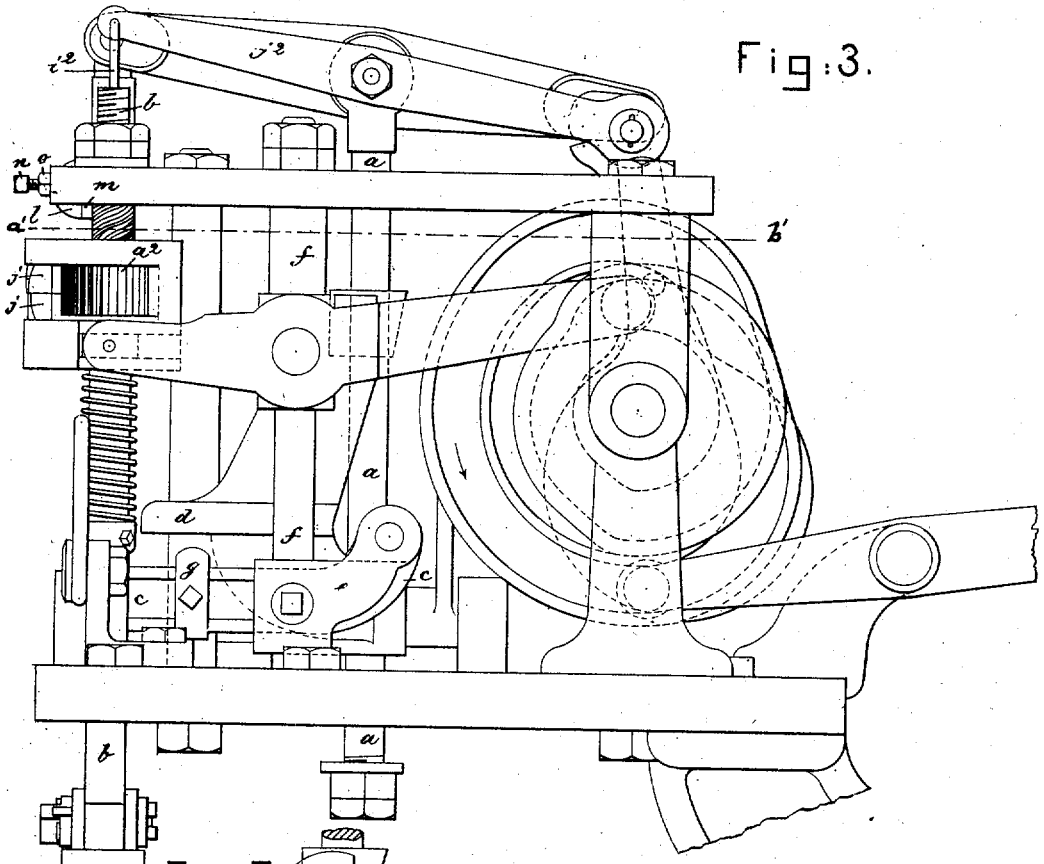
Figure 7:
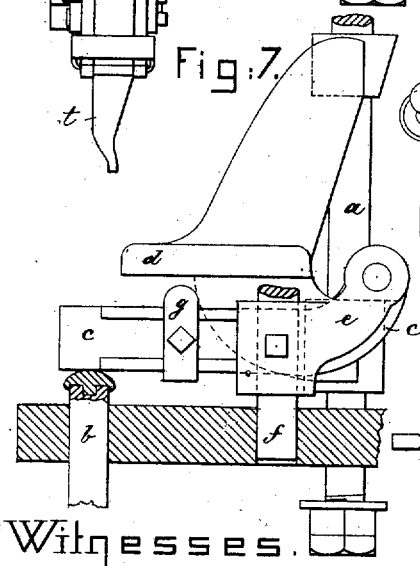
Figure 6:
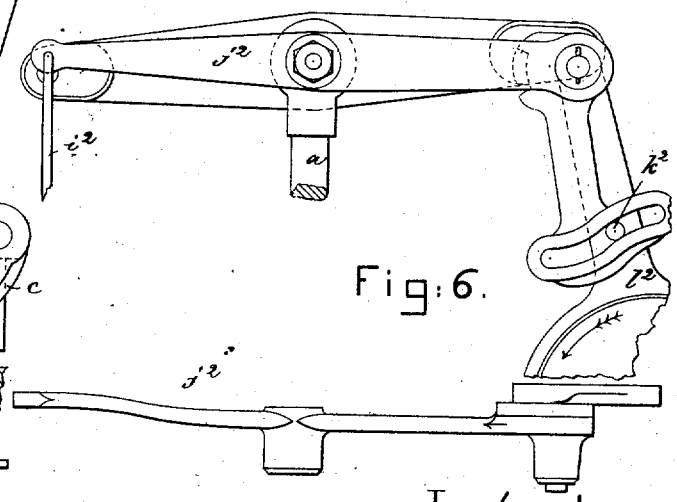
Figure 5:
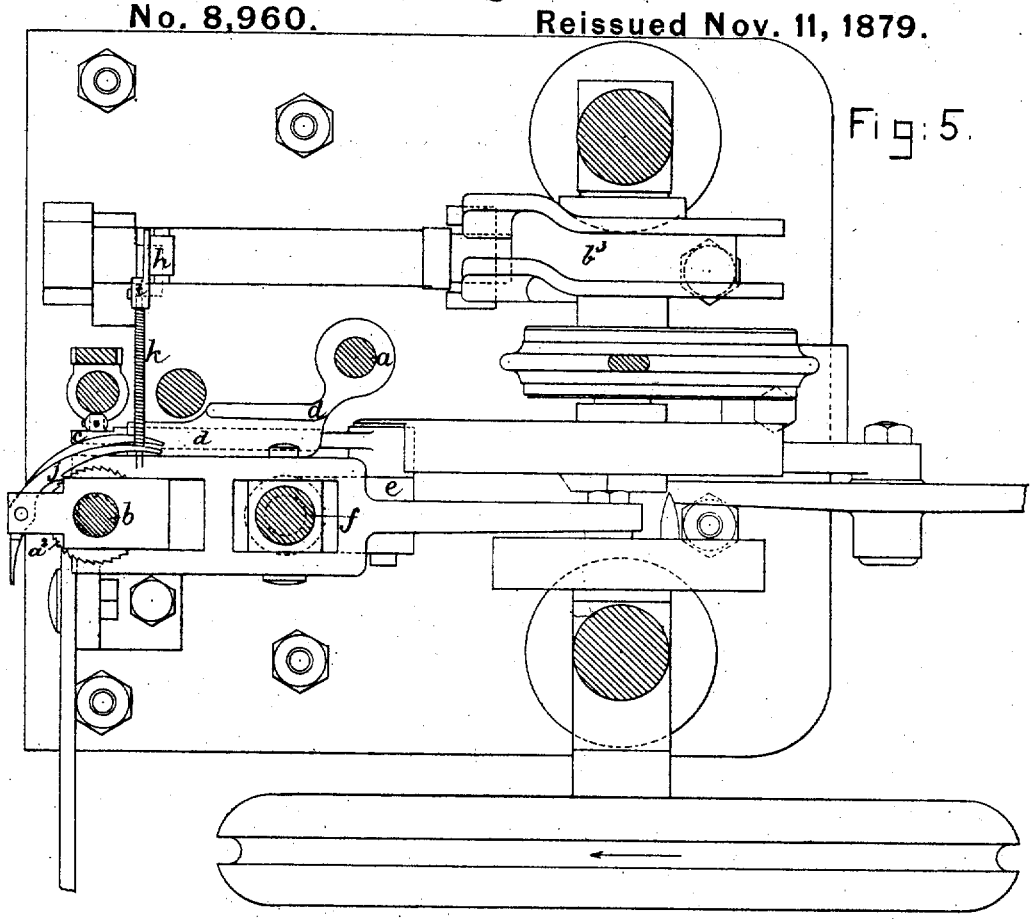
Figure 4:
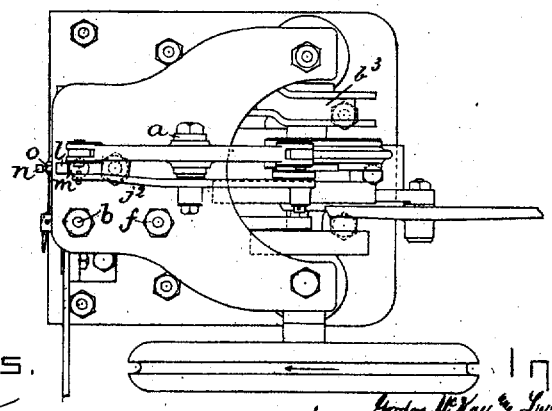

Figure 1 is a front elevation of a sewing-machine embodying this invention. Fig. 2 is a side elevation of the same. Fig. 3 is a side elevation of the upper works of the said machine, taken upon the side opposite to that shown in Fig. 2. Fig. 4 is a plan of said upper works. Fig. 5 is a sectional plan of the same, the section being taken beneath the top plate of the upper works, and in the plane of the line *a′ b′*, Fig. 3. Fig. 6 shows in detail the mechanism which operates the slide which covers at times the hook of the needle. Fig. 7 shows in side elevation the means which, in connection with a mechanism for reciprocating the needle and a rest upon or connected with the presser-foot, provides for adjusting the ratio of the needle stroke with reference to the vertical changes of the position of the presser-foot obtained by resting upon the stock. Fig. 8 comprises all the drawings seen on the sheet marked with that figure, the same being illustrations of the horn or work-bed of the machine in plan and in section.

It is well known that in sewing together the soles of boots and shoes it is essential to the durability of the work that the layers of leather shall be drawn together, and shall be held together by the stitches very tightly, and for this purpose it is important to draw home each stitch with all the strain which the strength of the thread being used will permit without breaking.

The thickness of the stock to be united will vary very much in different shoes, from a thin slipper up to a double-soled or tap-soled boot of heavy leather, and will vary much in each shoe as the operator passes from the shank to the fore part or around the heel. If the stroke of the needle be made long enough to draw from the spool sufficient thread for any given thickness of work, and the tension be obtained by friction on the spool in the way practiced in ordinary sewing-machines, the needle at each stroke, in drawing in the slack of the previously-formed stitch to tighten it, upon any variation in the thickness of the stock, will cause the thread to render through the hook of the needle, and the scraping of the thick waxed thread by the hook of the needle under the heavy strain required in waxed-thread sole-sewing machines will, if continued, chafe the fibers and weaken the thread so that it will break under the strain of setting the stitch. It is therefore essential to the successful operation of this class of machines that the needle at each stroke shall draw from the old and last-formed loop just so much thread to form one side of the new loop, as it draws from the spool to form the other side of the new loop, and that the length of the old loop and the needle-stroke shall be such that when the needle has completed its upstroke the old loop shall be drawn into a tight stitch with all the strain the normal strength of the thread will bear.

It is evident that the thicker the work the more thread must be drawn off from the reel at each stroke of the needle, in order that the loop may be long enough to supply what is required for the stitch that is being made, and to supply also enough for one-half of the next loop. In order to accomplish this, it is necessary to contrive that every variation in the thickness of stock shall cause the due and proper corresponding variation in the stroke of the needle which is to tighten the old stitch and draw off thread for the new.

The aforesaid patent of McKay & Mathies describes devices intended to vary the stroke of the needle in accordance with the distance apart of the presser-foot and horn, which distance depends upon the thickness of the stock placed between them to be united, and the ratio of increase or diminution in the length of stroke which is described in that patent as required, and which is obtained in that machine, is twice the increase or diminution in the thickness of the stock, and in that patent it is not possible to change the said ratio. This ratio is theoretically correct; but with any machine which regulates the length of the needle-stroke by means of the changing distance between the presser-foot and horn the conditions under which it is practically operated vary considerably from the theoretical conditions upon which said ratio is calculated. For example, the stock, when composed of one thickness of leather, and still more when composed of several, will yield and be compressed under the operation of the machine, and the thicker the stock the more the compression, other things being equal.

The stress of the presser-foot spring will force the presser-foot into the leather. The softer the leather the deeper it will penetrate. The thicker the stock the more the spring is strained, and the more the presser-foot will be pressed down.

There is a certain bending of the stock in the machine, and its surface is not always held uniformly by the operator.

We have discovered that the effect of these conditions of the work is such that the increase of the stroke in the McKay & Mathies machine is always too great in practice, thereby making a loop, which, at the next operation of the needle, is not drawn in sufficiently, owing to its length, to insure a tight stitch, whereas for sewing which will not rip the loop must be shortened, so as to be less than twice the length of the increase or diminution in the thickness of the stock.

It will be seen, also, that if the thread renders at all through the eye of the needle the direction in which it renders becomes a matter of importance, for if it renders toward the spool—that is, if the hook of the needle scrapes along the thread from the spool toward the old stitch—the strain exerted upon the spool end of the thread will be one-half the mechanical force of the needle-stroke, the slipping force, or that force required to bend and draw the heavy waxed thread through the hook of the needle, and the strain exerted upon the old stitch which is to be drawn tight, will be much less, and the thread will break before the strain necessary to give the stitch its desired tightness is reached.

As it will not be possible, under the accidental variations in the stock and in the handling of the shoe by the operator, always to cause the stroke of the needle to be of the right length with mathematical accuracy, it is desirable for good work that the length of the loop shall be so regulated as to be a trifle too short rather than too long, so that the hook of the needle, so far as it tends to slip at all, shall tend to slip from the old stitch toward the spool, in order that the maximum strain (intended to be all that the strength of the thread will bear) which is exercised on any part of the thread shall be exercised on that side of the loop which is drawing home the stitch then being tightened.

We have also discovered that most of the practical conditions which require the variations from the theoretical lift of the needle, as well as the theoretical lift itself, are resultants of variations in the thickness of the stock, so that the distance apart of the presser-foot and horn can conveniently be applied with substantial accuracy to determine the length of the needle-stroke which will practically be the best.

It should be observed that in the ordinary use of the McKay & Mathies machine it is customary to adjust the stroke of the needle for the thinnest possible or an imaginary thickness of leather, then to rely on the automatic variations of the needle-stroke to give the needle proper length of stroke for thicknesses of the stock being sewed. The regulation of this variation determines, therefore, the length of every stroke made by the needle in its ordinary operation. One chief object of this invention is, therefore, to so adapt the mechanism of a sewing-machine in which the varying thickness of the stock causes variations in the stroke of the needle that the ratio between the stroke of the needle and the thickness of the stock shall be so much less than that which gives the length theoretically required as is necessary, in the practical operation of uniting the soles of boots or shoes to their uppers, to insure the making of a tight stitch.

As explained in the aforesaid patent, the proportions of the parts and the arrangement of the leverage are such that if the fulcrum-bar *a* of the needle-lever rested on the presser-bar *b* the change in the needle-stroke would be twice that in the thickness of the stock. To make provision for lessening this ratio, the lever or bar *c* is interposed between the projection *d* from the fulcrum-bar *a* and the presser-bar *b* in such manner that while the part of *c* which rests upon *b* has a movement identical therewith one end of the bar *c* shall have very little or no movement.

As when this invention was made several machines existed to which it was desirable to apply it, one end of *c*, which it was desired to keep still, or nearly so, was pivoted, for convenience, to the stand *e*, which was easily made and secured to the presser-lever fulcrum-bar *f*, and thus, in the construction shown in the drawings, the pivoted end of *c* has accidentally the slight movement which the fulcrum-bar *f* may have.

The slide-piece or fulcrum *g* is so made that it may be moved and fixed in position anywhere on bar *c*, and on this adjustable fulcrum *g* the arm or projection *d* rests at the proper times, it being so shaped as to extend over *g* in any position in which it may be set.

It will be obvious that the ratio of the change of the needle-stroke caused by change in thickness of the stock will be lessened as the fulcrum *g* is moved to the still or pivoted end of *c*.

The position of the fulcrum-piece *g* shown in the drawings is that which we have found best in practice, and it is obvious that it need not be moved, unless the conditions of the work shall essentially change from those we have commonly met with.

If the stitch is drawn more loosely as the work becomes thicker, or if the thread is stronger than that in common use, the evil may be corrected, or the greater strength of the thread may be taken advantage of by moving the stop toward the center of the lever *c*. On the other hand, if it grows tighter as the thickness increases, the stop should be moved toward the free end of the lever, for placing the fulcrum *g* directly over the presser-foot will give the stroke its theoretical variation, which is always too great in practice, and placing it over the pivot of the lever *c* will diminish the variation to zero, which is always too little.

In the aforesaid patent it was shown and described in two ways how the presser-foot was freed from such control as prevented its descent.

The first way was to liberate the presser-foot at its greatest elevation, and the second was to liberate it at the lowest point to which the action of its cam brought it.

The last way of working the presser-foot has been found best in practice, and one part of this invention relates to the means by which the presser-foot is freed from control when brought to the lowest point of throw given by its cam.

From the rocker-shaft which works the feeder an arm, *h*, extends upward and gives motion to a link, *i*, to pull the pawl *j* out of gear with the ratchet-teeth on the presser-bar nut $a^2$, the motion given by the feed-cam $b^3$ being such as to operate at the right time by detaching the pawls from the nut to free the presser-bar from control at the time when it is most depressed by the presser-cam.

Small spiral springs *k* are coiled one around each arm of the link, and serve to keep the pawls in gear with the ratchet-teeth when not pulled out of gear by the means described. This part of the mechanism is best seen in Fig. 5, and parts thereof are also shown in Figs. 1, 2, and 3.

The needle-bar $b^2$ is driven by the positive throw of an eccentric, but has a rest from movement both at its highest and lowest point of movement. To render it certain that the needle shall rest at these points, as is needed for the perfect operation of the machine, it is necessary to make the needle-bar move with more difficulty than does the needle-lever fulcrum-bar, so that when the needle-bar and its lever-fulcrum bar are both free to move it will be certain that the latter will move by reason of its moving upon less expenditure of force, thereby giving times of rest to the needle at the extremes of its stroke. This object was partially accomplished in the aforesaid patent—that is to say, the rest of the needle was obtained at the top of the stroke by the use of a counterbalancing-spring, and at the bottom of the stroke by the friction of the needle in the stock and the resistance offered by the loop of thread when entered into the hook of the needle, and this partially but not certainly answered the purpose.

One part of this invention consists in the application of an adjustable yielding pressure-pad to the needle-bar, which secures the needed times of rest from motion to the needle, it being capable of adjustment to all the varying conditions of the machine.

In one of the plates of the upper works, preferably the top one, is fitted the gib *l*, faced with a leather pad, *m*, so as to work smoothly with the needle-bar, and back of the gib, concealed in the plate, is a spring, against which the set-screw *n* acts to force the leather face of the gib into contact with the needle-bar, and so produce that amount of friction needed under any circumstances of practical usage to hold the needle at rest at the top and bottom of its stroke.

The check-nut *o* serves to prevent derangement of adjustment of this friction-pad. In this connection reference may be had to Figs. 3 and 4, also to Fig. 1.

In the use of the aforesaid patented machine heat is always applied to the horn to keep the wax on the thread in a soft and plastic condition; but heat so applied expanded the small inclined shaft in the horn more than it expanded the horn, and damage resulted from such expansion to the pinion-shaft, the whirl, and the tip of the horn.

One part of this invention consists in introducing into the inclined shaft an expansion-joint, so that the increase of length in the shaft shall not crowd the teeth of the whirl and of the pinion, which drives it too closely together, or otherwise injure the parts located in or at the end of the horn, which, from the necessities of the case, have to be made as small as possible.

Reference may here be had to Fig. 8, where it will be seen that the inclined shaft is made up of two pieces, *p* and *q*. On one end of *p* the pinion is formed which meshes into and drives the whirl $m^2$, while the other end is simply slotted.

On *p* a grooved collar, *r*, is placed, and made capable of adjustment thereupon by a set-screw.

The forked piece *s* fits the groove around the collar, and is secured to the horn, and it will be obvious that the teeth of the pinion can be nicely adjusted with relation to the teeth of the whirl by means of the collar and set-screw.

The upper end of *q* is bored to admit the slotted end of *p*, and a pin in *q* entering the slot in *p* makes the two parts of the inclined shaft to move in unison when the part *q* is rotated, while it is obvious that expansion of *q* will produce no other effect than to slide its pin in the slot in *p*. The part *p* is less exposed to heat than is the part *q*, and is, besides, so short from its fixed point—the collar *s*—that its expansion is not noticeable in practice.

In connection with the horn $e^2$, it may be observed that it has been found best to change the small grooved guide-wheel, over which the thread passed from the spool on its passage to the whirl, into a roll, $f^2$, one end of which, being heated by the same means employed to heat the horn, keeps the other end, over which the thread passes, warm enough to prevent wax from sticking thereto, which, with the grooved guide-wheel just mentioned, caused irregularities in the sewing. This is illustrated in the cross section embodied in Fig. 8.

In the aforesaid patent it is described how the length of the stitches is changed, also how and why the stroke of the needle should be changed when the length of the stitches is altered.

Inspection of Fig. 1 will show some modifications connected with the presser, by which, when its position is changed to alter the length of the stitch, the proper length of needle-stroke is secured by the same adjustment and without care or thought on the part of the operator. On reference to said figure it will appear that the presser *t* is secured to the presser-bar by a joint, $g^2$, which is made substantially on the angle shown, the effect of which is as follows: When the stitch is shortened by moving the presser-foot *t* toward the needle, that part of the presser-bar which supports the needle-lever fulcrum-bar is lowered, which allows more lost motion to the needle-lever fulcrum, and consequently shortens the needle-stroke. When the stitch is lengthened by moving the presser-foot from the needle, this raises the presser-bar and lessens the lost motion of the needle-lever fulcrum, consequently increasing the length of needle-stroke.

The inclined or cam slots $h^2$, which modify the movement of the feeder *u*, it will be seen on inspection of Fig. 1, have been changed in detail of construction, they being no longer formed on or in part as portions of the presser-bar, but are now made as separate pieces, capable of easy change if worn or injured, and are secured to the presser-foot so as to always move with it.

The detail by which the needle-slide $i^2$ is operated is also changed in some respects from that contained in the aforesaid patent, as will be seen on inspection of Fig. 6, where the improved connections between the cast-off or slide lever $j^2$ and the pin in the arm of the eccentric strap $l^2$ are plainly shown.

By this improved connection the formerly-used spring-notched catch is dispensed with, and the difficulties occasioned by its breakage and occasional failure to act are avoided, and the movements of the slide remain precisely as described in the aforesaid patent.

I claim—

1. The combination, with a sewing-machine wherein the stroke of the needle is automatically varied by the thickness of the stock, a rest for one side of the stock, a presser-foot to bear upon the other side of the stock, a reciprocating needle-bar, and needle and needle-actuating mechanism therefor, of the means, substantially as described, operating to automatically vary the length of loop, according to the variations in the stock, less than twice the increase or diminution in the thickness of the stock.

2. That improvement in the art or method of sewing soles of boots and shoes with waxed-thread sewing-machine wherein the tightness of the stitch is made to depend upon the length of the needle-stroke, and wherein the stock united varies in thickness, which consists in varying the length to which each loop is drawn at those parts of the sole where the stock varies in thickness to a distance less than twice the increase or diminution in the thickness of the stock, whereby the loop is formed of the proper length to make a tight stitch, substantially as described.

3. The combination, with a needle and needle-bar and mechanism for reciprocating the same, of an adjustable pressure-pad or device for producing any desired degree of retardation of the needle, substantially as and for the purpose described.

4. The horn and whirl, combined with a whirl-driving shaft provided with an expansion-joint, for the purpose specified.

5. The presser-foot shank provided with a screw-thread, as described, combined with an internally screw-threaded ratchet-wheel, and the pawl, its connected link, and rocking arm, and mechanism to rock the latter to enable the pawl to lock and release the ratchet-wheel at the proper times, substantially as described.

GORDON McKAY,
*Trustee McKay Sewing Machine Association.*

Witnesses:
S. R. ARCHIBALD,
FRED O. STANTON.